US012658126B2

(12) United States Patent
Kim et al.

(10) Patent No.: US 12,658,126 B2
(45) Date of Patent: Jun. 16, 2026

(54) DISPLAY DEVICE

(71) Applicant: Samsung Display Co., Ltd., Yongin-Si (KR)

(72) Inventors: Hyojung Kim, Yongin-si (KR); Deok Jun Choi, Yongin-si (KR); Hyun-Chang Kang, Yongin-si (KR); Yunhee Kwak, Yongin-si (KR); Yoo-Young Park, Yongin-si (KR); Hyesun Sung, Yongin-si (KR); Ji-Hyeon Son, Yongin-si (KR); Seungbo Shim, Yongin-si (KR); Jeong Yong Lee, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 204 days.

(21) Appl. No.: 18/603,221

(22) Filed: Mar. 13, 2024

(65) Prior Publication Data

US 2025/0046245 A1 Feb. 6, 2025

(30) Foreign Application Priority Data

Aug. 1, 2023 (KR) ........................ 10-2023-0100409

(51) Int. Cl.
*G09G 3/3233* (2016.01)

(52) U.S. Cl.
CPC ... *G09G 3/3233* (2013.01); *G09G 2300/0426* (2013.01); *G09G 2300/0819* (2013.01);
(Continued)

(58) Field of Classification Search
CPC ... G09G 2300/0426; G09G 2300/0819; G09G 2300/0842; G09G 2300/0861;
(Continued)

(56) References Cited

U.S. PATENT DOCUMENTS 10,100,151 B2 10/2018 Chae et al.
11,276,349 B2 * 3/2022 Park ..................... G09G 3/3225
(Continued)

FOREIGN PATENT DOCUMENTS

CN 108091302 A * 5/2018 ........... G09G 3/3225
KR 10-2018-0001175 A 1/2018
(Continued)

*Primary Examiner* — Ricardo Osorio
(74) *Attorney, Agent, or Firm* — Innovation Counsel LLP

(57) ABSTRACT

A display device is disclosed that includes a display panel including a plurality of pixels configured to receive an initialization voltage through an initialization voltage line, a controller configured to output a voltage control signal for controlling a voltage level of the initialization voltage, and a power manager configured to provide the initialization voltage to the initialization voltage line, change the voltage level of the initialization voltage to an initialization level at or after a power-on time at which a power starts to be supplied and before a display-on time at which an image starts to be displayed based on the voltage control signal, and change the voltage level of the initialization voltage to a target level corresponding to a luminance of the image at or after the display-on time based on the power control signal.

18 Claims, 9 Drawing Sheets

(52) U.S. Cl.
CPC ............... *G09G 2300/0842* (2013.01); *G09G 2300/0861* (2013.01); *G09G 2320/02* (2013.01); *G09G 2330/021* (2013.01)

(58) Field of Classification Search
CPC ......... G09G 2320/02; G09G 2330/021; G09G 3/3233; G09G 3/32; G09G 3/3208; G09G 3/035; G09G 2300/0809; G09G 2310/08; G09G 2320/0214; G09G 2380/02
See application file for complete search history.

(56) References Cited

U.S. PATENT DOCUMENTS

| | | | | |
|---|---|---|---|---|
| 11,856,823 | B2 | 12/2023 | Cho et al. | |
| 2017/0148379 | A1* | 5/2017 | Cho | G09G 3/3233 |
| 2021/0134227 | A1* | 5/2021 | Im | G09G 3/3266 |
| 2023/0108936 | A1 | 4/2023 | Jeon et al. | |

FOREIGN PATENT DOCUMENTS

| | | | | | |
|---|---|---|---|---|---|
| KR | 10-2276288 | B1 | | 7/2021 | |
| KR | 10-2021-0142045 | A | | 11/2021 | |
| KR | 10-2023-0049190 | A | | 4/2023 | |
| TW | 1815667 | B | * | 9/2023 | G09G 3/3258 |
| TW | 1818605 | B | * | 10/2023 | G09G 3/3258 |
| WO | WO-2012032560 | A1 | * | 3/2012 | G09G 3/325 |

* cited by examiner

DISPLAY DEVICE

CROSS-REFERENCE TO RELATED APPLICATION(S)

This application claims priority under 35 USC § 119 to Korean Patent Application No. 10-2023-0100409 filed on Aug. 1, 2023, in the Korean Intellectual Property Office (KIPO), the entire disclosure of which is incorporated by reference herein.

BACKGROUND

1. Field

Embodiments relate to a display device. More particularly, embodiments relate to a display device which includes a flexible substrate.

2. Description of the Related Art

A display device may include a substrate, and transistors and voltage lines disposed on the substrate. The transistor may be turned on in response to a signal applied to a gate electrode, and the voltage line may transmit a voltage to a source or drain electrode of the transistor.

When voltages having mutually different polarities are applied to the gate electrode of the transistor and the voltage line, which are adjacent to each other, respectively, induced charges may be accumulated in a portion of the substrate located under the transistor, and a threshold voltage of the transistor may be shifted by the induced charges. When the threshold voltage of the transistor is shifted, a leakage current of the transistor may be increased, and display quality of an image displayed by the display device may deteriorate.

SUMMARY

Embodiments may provide a display device in which display quality of an image is improved.

An embodiment of a display device includes a display panel including a plurality of pixels configured to receive an initialization voltage through an initialization voltage line, a controller configured to output a voltage control signal for controlling a voltage level of the initialization voltage, and a power manager configured to provide the initialization voltage to the initialization voltage line, change the voltage level of the initialization voltage to an initialization level at or after a power-on time at which a power starts to be supplied and before a display-on time at which an image starts to be displayed based on the voltage control signal, and change the voltage level of the initialization voltage to a target level corresponding to a luminance of the image at or after the display-on time based on the power control signal.

In an embodiment, an absolute value of the initialization level may be less than an absolute value of the target level.

In an embodiment, the initialization level may be about −1 V to about 1 V.

In an embodiment, a polarity of the initialization level may be different from a polarity of the target level.

In an embodiment, the power manager may be configured to change the voltage level of the initialization voltage to a predetermined fixed level at or after the power-on time and before the voltage level of the initialization voltage is changed to the initialization level. An absolute value of the initialization level may be less than an absolute value of the fixed level.

In an embodiment, the power manager may be configured to change the voltage level of the initialization voltage from the target level to the initialization level at or after a display-off time at which the display of the image starts to end and before a power-off time at which the supply of the power starts to be cut off based on the voltage control signal.

In an embodiment, the power manager may be configured to change the voltage level of the initialization voltage to a predetermined fixed level at or after the display-off time and before the voltage level of the initialization voltage is changed to the initialization level. An absolute value of the initialization level may be less than an absolute value of the fixed level.

In an embodiment, the power manager may be configured to change the voltage level of the initialization voltage from the target level to the initialization level during a vertical porch period in which a data voltage is not provided to each of the pixels based on the voltage control signal.

In an embodiment, each of the pixels may include a driving transistor configured to generate a driving current, a write transistor connected between the driving transistor and a data line configured to transmit a data voltage, a light emitting diode configured to emit a light based on the driving current, and a bypass transistor connected between the initialization voltage line and the light emitting diode.

In an embodiment, the initialization voltage line may at least partially overlap a gate electrode of the write transistor.

An embodiment of a display device includes a display panel including a plurality of pixels configured to receive an initialization voltage through an initialization voltage line, a controller configured to output a voltage control signal for controlling a voltage level of the initialization voltage, and a power manager configured to provide the initialization voltage to the initialization voltage line, and change the voltage level of the initialization voltage from a target level corresponding to a luminance of an image to an initialization level at or after a display-off time at which display of the image starts to end and before a power-off time at which supply of a power starts to be cut off based on the voltage control signal. An absolute value of the initialization level may be less than an absolute value of the target level.

In an embodiment, the initialization level may be about −1 V to about 1 V.

In an embodiment, a polarity of the initialization level may be different from a polarity of the target level.

In an embodiment, the power manager may be configured to change the voltage level of the initialization voltage to a predetermined fixed level at or after the display-off time and before the voltage level of the initialization voltage is changed to the initialization level. The absolute value of the initialization level may be less than an absolute value of the fixed level.

In an embodiment, the power manager may be configured to change the voltage level of the initialization voltage to the target level during an active period in which a data voltage is provided to each of the pixels based on the voltage control signal, and change the voltage level of the initialization voltage from the target level to the initialization level during a vertical porch period in which the data voltage is not provided to each of the pixels based on the voltage control signal.

In an embodiment, each of the pixels may include a driving transistor configured to generate a driving current, a write transistor connected between the driving transistor and a data line configured to transmit a data voltage, a light emitting diode configured to emit a light based on the driving current, and a bypass transistor connected between the initialization voltage line and the light emitting diode.

An embodiment of a display device includes a display panel including a plurality of pixels configured to receive an initialization voltage through an initialization voltage line, a controller configured to output a voltage control signal for controlling a voltage level of the initialization voltage, and a power manager configured to provide the initialization voltage to the initialization voltage line, change the voltage level of the initialization voltage to a target level corresponding to a luminance of an image in an active period in which a data voltage is provided to each of the pixels based on the voltage control signal, and change the voltage level of the initialization voltage from the target level to an initialization level in a vertical porch period in which the data voltage is not provided to each of the pixels based on the voltage control signal. An absolute value of the initialization level may be less than an absolute value of the target level.

In an embodiment, the initialization level may be about −1 V to about 1 V.

In an embodiment, a polarity of the initialization level may be different from a polarity of the target level.

In an embodiment, each of the pixels may include a driving transistor configured to generate a driving current, a write transistor connected between the driving transistor and a data line configured to transmit the data voltage, a light emitting diode configured to emit a light based on the driving current, and a bypass transistor connected between the initialization voltage line and the light emitting diode.

In the display device according to the embodiments, the absolute value of the voltage level of the initialization voltage may be reduced at or after the power-on time and before the display-on time, at or after the display-off time and before the power-off time, or in the vertical porch period within the frame period, so that the amount of induced charges in the flexible substrate may be reduced, and a shift of a threshold voltage of a transistor may be reduced. Accordingly, display quality of an image displayed by the display device may be improved.

BRIEF DESCRIPTION OF THE DRAWINGS

Illustrative, non-limiting embodiments will be more clearly understood from the following detailed description taken in conjunction with the accompanying drawings.

DETAILED DESCRIPTION OF THE EMBODIMENTS

Figure 1:
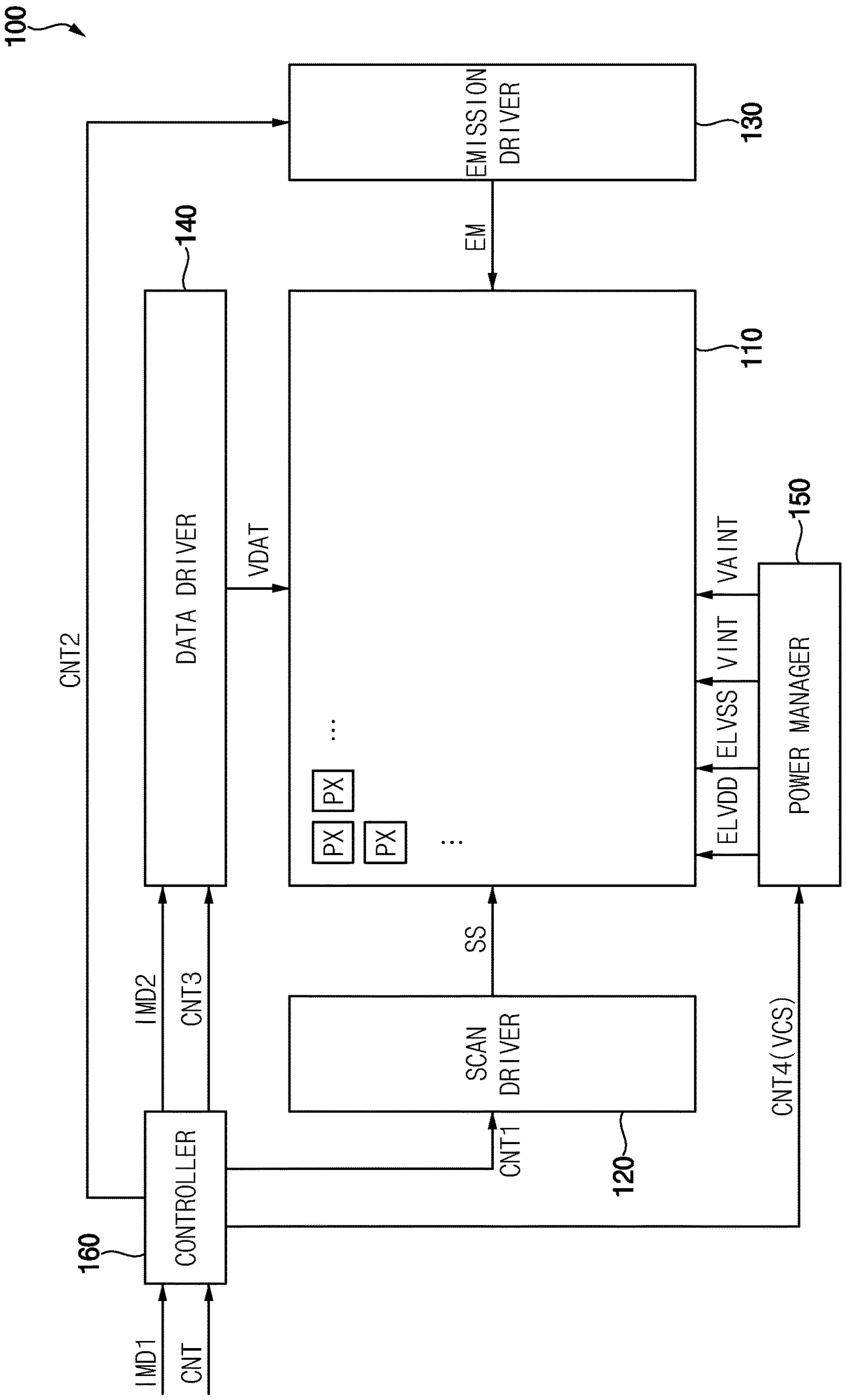
FIG. 1 is a block diagram showing a display device according to an embodiment of the present disclosure.

Hereinafter, a display device according to embodiments of the present disclosure will be described in more detail with reference to the accompanying drawings. The same or similar reference numerals will be used for the same elements in the accompanying drawings.

FIG. 1 is a block diagram showing a display device 100 according to an embodiment of the present disclosure.

Referring to FIG. 1, a display device 100 may include a display panel 110, a scan driver 120, an emission driver 130, a data driver 140, a power manager 150, and a controller 160.

The display panel 110 may include pixels PX. According to an embodiment, the pixels PX may include a first pixel configured to emit a light having a first color, a second pixel configured to emit a light having a second color, and a third pixel configured to emit a light having a third color. For example, the first color, the second color, and the third color may be red, green, and blue, respectively.

The scan driver 120 may provide scan signals SS to the pixels PX. The scan driver 120 may sequentially generate first to $n^{th}$ scan signals SS (where n is a natural number that is greater than or equal to 2) corresponding to first to $n^{th}$ pixel rows, respectively, based on a first control signal CNT1. The first control signal CNT1 may include a scan clock signal, a scan start signal, and the like.

The emission driver 130 may provide emission signals EM to the pixels PX. The emission driver 130 may sequentially generate first to $n^{th}$ emission signals EM corresponding to the first to $n^{th}$ pixel rows, respectively, based on a second control signal CNT2. The second control signal CNT2 may include an emission clock signal, an emission start signal, and the like.

The data driver 140 may provide data voltages VDAT to the pixels PX. The data driver 140 may generate first to $m^{th}$ data voltages VDAT (where m is a natural number that is greater than or equal to 2) corresponding to first to $m^{th}$ pixel columns, respectively, based on second image data IMD2 and a third control signal CNT3. According to an embodiment, the second image data IMD2 may include gray level values corresponding to the pixels PX, respectively. The third control signal CNT3 may include a data clock signal, a horizontal start signal, a load signal, and the like.

The power manager 150 may provide a first power voltage ELVDD, a second power voltage ELVSS, a first initialization voltage VINT (hereinafter referred to as a "gate initialization voltage"), and a second initialization voltage VAINT (hereinafter referred to as an "initialization voltage") to the pixels PX. The power manager 150 may generate the first power voltage ELVDD, the second power voltage ELVSS, the gate initialization voltage VINT, and the initialization voltage VAINT based on a fourth control signal CNT4. The fourth control signal CNT4 may include a voltage control signal VCS for controlling a voltage level of the initialization voltage VAINT. The power manager 150 may change the voltage level of the initialization voltage VAINT based on the voltage control signal VCS.

The controller 160 may control an operation or driving of the scan driver 120, an operation or driving of the emission driver 130, an operation or driving of the data driver 140, and an operation or driving of the power manager 150. The controller 160 may generate the first control signal CNT1, the second control signal CNT2, the second image data IMD2, the third control signal CNT3, and the fourth control signal CNT4 based on first image data IMD1 and a control signal CNT. According to an embodiment, the first image data IMD1 may include gray level values corresponding to the pixels PX, respectively. The controller 160 may convert the first image data IMD1 into the second image data IMD2. The control signal CNT may include a master clock signal, a vertical synchronization signal, a horizontal synchronization signal, a data enable signal, and the like.

Figure 2:
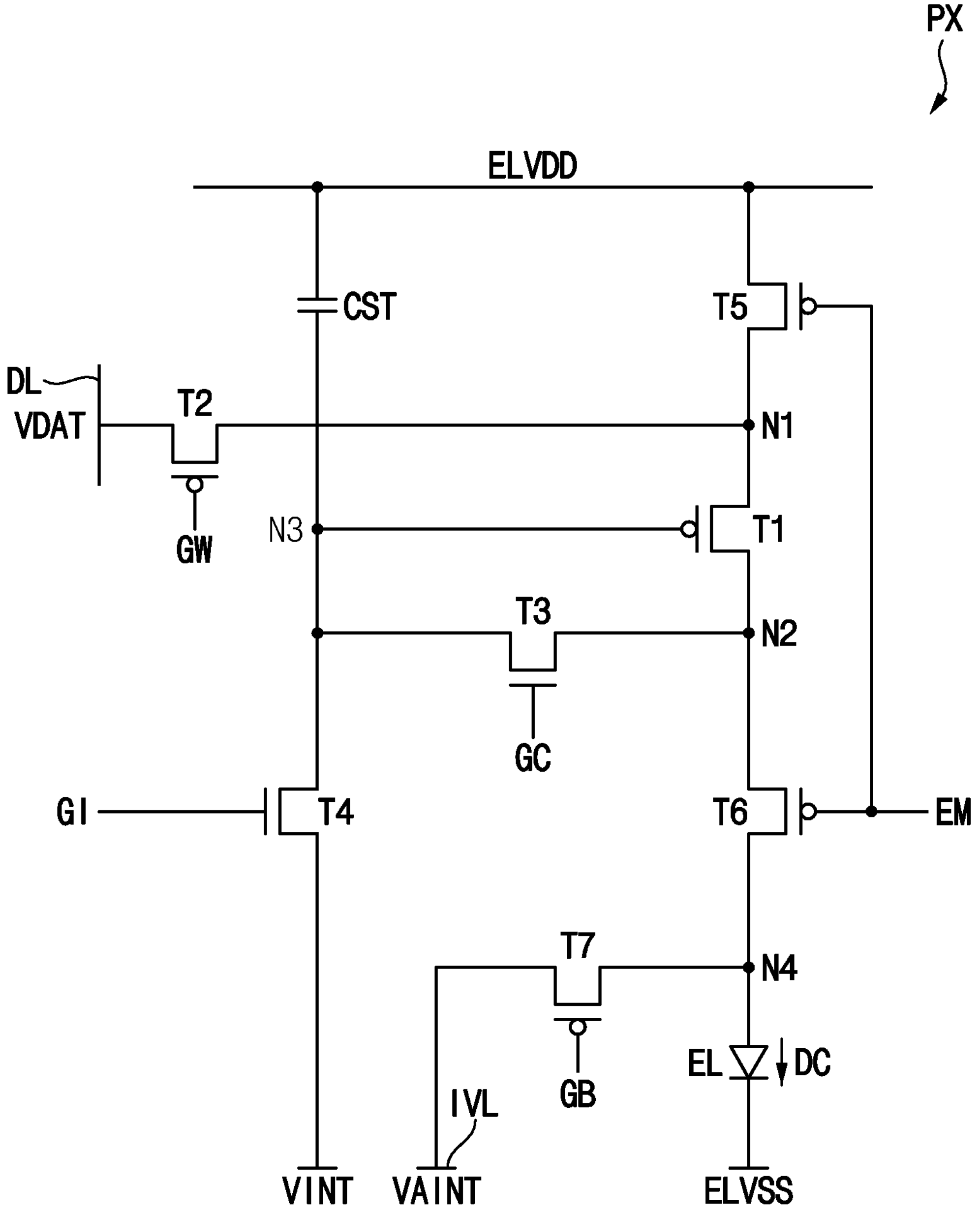
FIG. 2 is a circuit diagram showing a pixel included in the display device of FIG. 1.

FIG. 2 is a circuit diagram showing a pixel PX included in the display device 100 of FIG. 1.

Referring to FIGS. 1 and 2, the pixel PX may include a driving transistor T1 (hereinafter referred to as a "first transistor"), a write transistor T2 (hereinafter referred to as a "second transistor"), a compensation transistor T3 (hereinafter referred to as a "third transistor"), an initialization transistor T4 (hereinafter referred to as a "fourth transistor"), a first emission transistor T5 (hereinafter referred to as a "fifth transistor"), a second emission transistor T6 (hereinafter referred to as a "sixth transistor"), a bypass transistor T7 (hereinafter referred to as a "seventh transistor"), a storage capacitor CST, and a light emitting diode EL. The scan signal SS may include a write gate signal GW, a compensation gate signal GC, an initialization gate signal GI, and a bypass gate signal GB.

The first transistor T1 may be connected between a first node N1 and a second node N2. The first transistor T1 may include a first electrode connected to the first node N1, a second electrode connected to the second node N2, and a gate electrode connected to a third node N3. The first transistor T1 may generate a driving current DC corresponding to a voltage between the first node N1 and the third node N3.

The second transistor T2 may be connected between the first node N1 and a data line DL configured to transmit the data voltage VDAT, and turned on in response to the write gate signal GW. The second transistor T2 may include a first electrode connected to the data line DL, a second electrode connected to the first node N1, and a gate electrode configured to receive the write gate signal GW. The second transistor T2 may transmit the data voltage VDAT to the first node N1 in response to the write gate signal GW.

The third transistor T3 may be connected between the second node N2 and the third node N3, and turned on in response to the compensation gate signal GC. The third transistor T3 may include a first electrode connected to the second node N2, a second electrode connected to the third node N3, and a gate electrode configured to receive the compensation gate signal GC. The third transistor T3 may connect the second node N2 to the third node N3 in response to the compensation gate signal GC. According to an embodiment, the third transistor T3 may include a bottom gate electrode and a top gate electrode, which are configured to receive the compensation gate signal GC. In other words, the third transistor T3 may be a dual gate transistor.

The fourth transistor T4 may be connected between the third node N3 and a gate initialization voltage line configured to transmit the gate initialization voltage VINT, and turned on in response to the initialization gate signal GI. The fourth transistor T4 may include a first electrode connected to the gate initialization voltage line, a second electrode connected to the third node N3, and a gate electrode configured to receive the initialization gate signal GI. The fourth transistor T4 may transmit the gate initialization voltage VINT to the third node N3 in response to the initialization gate signal GI. According to an embodiment, the fourth transistor T4 may include a bottom gate electrode and a top gate electrode, which are configured to receive the initialization gate signal GI. In other words, the fourth transistor T4 may be a dual gate transistor.

The fifth transistor T5 may be connected between the first node N1 and a first power voltage line configured to transmit the first power voltage ELVDD, and turned on in response to the emission signal EM. The fifth transistor T5 may include a first electrode connected to the first power voltage line, a second electrode connected to the first node N1, and a gate electrode configured to receive the emission signal EM. The fifth transistor T5 may transmit the first power voltage ELVDD to the first node N1 in response to the emission signal EM.

The sixth transistor T6 may be connected between the second node N2 and a fourth node N4, and turned on in response to the emission signal EM. The sixth transistor T6 may include a first electrode connected to the second node N2, a second electrode connected to the fourth node N4, and a gate electrode configured to receive the emission signal EM. The sixth transistor T6 may connect the second node N2 to the fourth node N4 in response to the emission signal EM.

The seventh transistor T7 may be connected between the fourth node N4 and an initialization voltage line IVL configured to transmit the initialization voltage VAINT, and turned on in response to the bypass gate signal GB. The seventh transistor T7 may include a first electrode connected to the initialization voltage line IVL, a second electrode connected to the fourth node N4, and a gate electrode configured to receive the bypass gate signal GB. The seventh transistor T7 may transmit the initialization voltage VAINT to the fourth node N4 in response to the bypass gate signal GB.

Although an embodiment in which each of the first transistor T1, the second transistor T2, the fifth transistor T5, the sixth transistor T6, and the seventh transistor T7 is a P-type transistor (e.g., a PMOS transistor), and each of the third transistor T3 and the fourth transistor T4 is an N-type transistor (e.g., an NMOS transistor) has been shown in FIG. 2, the present disclosure is not limited thereto. According to another embodiment, at least one of the first transistor T1, the second transistor T2, the fifth transistor T5, the sixth transistor T6, and the seventh transistor T7 may be an N-type transistor, and at least one of the third transistor T3 and the fourth transistor T4 may be a P-type transistor.

The storage capacitor CST may be connected between the third node N3 and the first power voltage line. The storage capacitor CST may include a first electrode connected to the third node N3, and a second electrode connected to the first power voltage line. The storage capacitor CST may maintain a voltage of the third node N3.

Although an embodiment in which the pixel PX includes seven transistors and one capacitor has been shown in FIG.

2, the present disclosure is not limited thereto. According to another embodiment, the pixel PX may include three to six transistors or eight or more transistors, or two or more capacitors.

The light emitting diode EL may be connected between the fourth node N4 and a second power voltage line configured to transmit the second power voltage ELVSS. The light emitting diode EL may include a first electrode (e.g., an anode) connected to the fourth node N4, and a second electrode (e.g., a cathode) connected to the second power voltage line. The light emitting diode EL may emit a light based on the driving current DC.

According to an embodiment, the light emitting diode EL may be an organic light emitting diode. According to another embodiment, the light emitting diode EL may be an inorganic light emitting diode, a micro light emitting diode, or a quantum dot light emitting diode.

Figure 3:
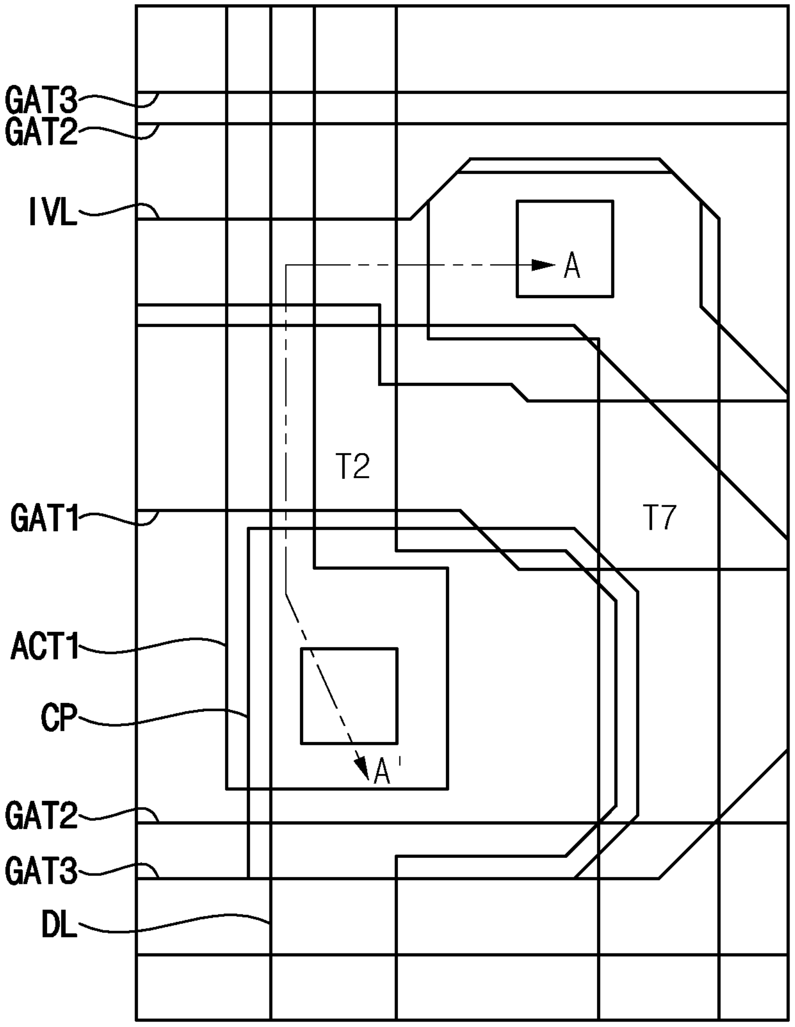
FIG. 3 is a plan view showing a portion of the pixel of FIG. 2.
Figure 4:
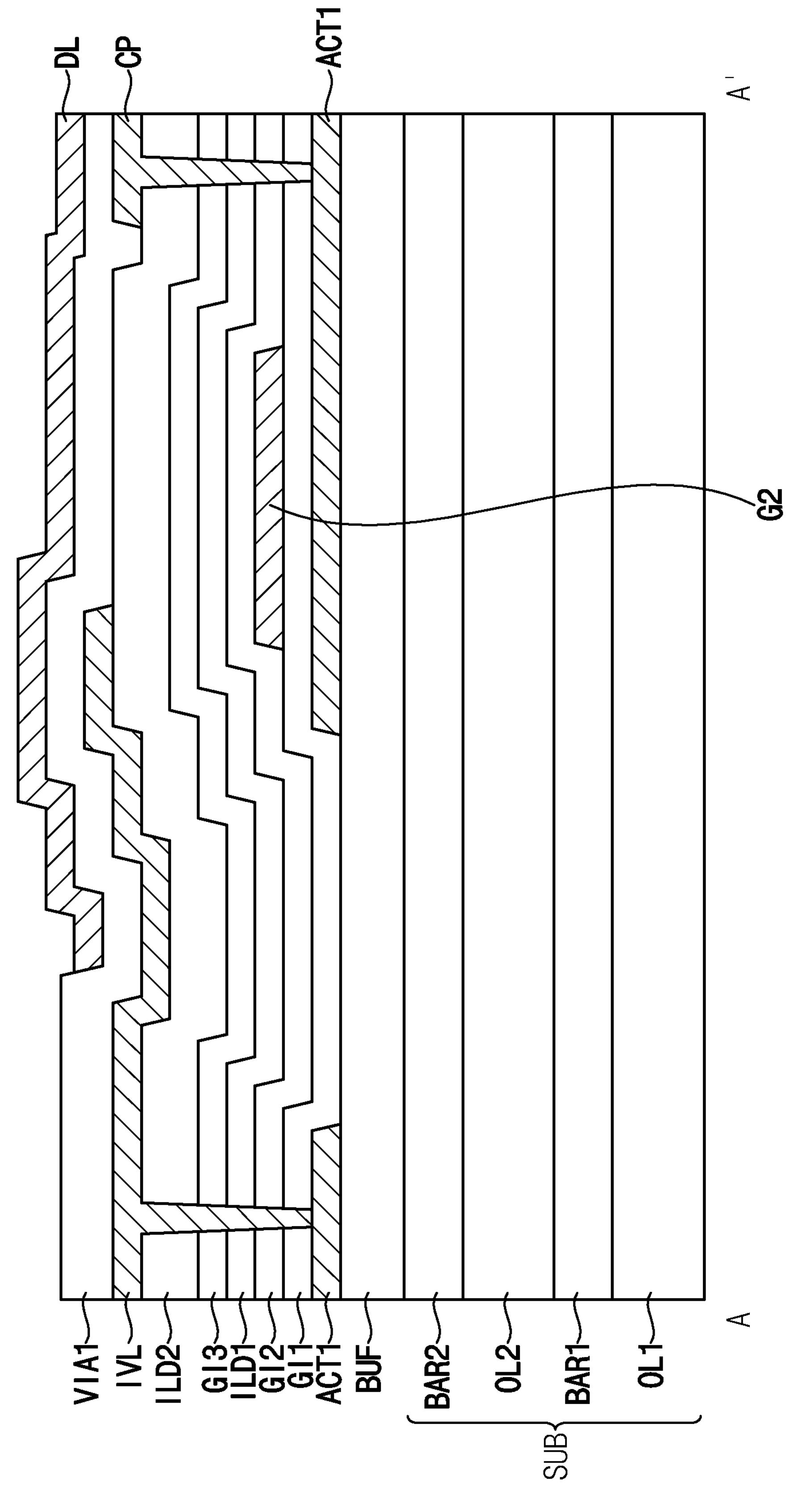
FIG. 4 is a sectional view taken along a line A-A' of FIG. 3.

FIG. 3 is a plan view showing a portion of the pixel PX of FIG. 2. FIG. 4 is a sectional view taken along a line A-A' of FIG. 3.

Referring to FIGS. 1 to 4, the pixel PX may include a substrate SUB, a buffer layer BUF, a first active layer ACT1, a first gate insulating layer GI1, a first gate layer GAT1, a second gate insulating layer GI2, a second gate layer GAT2, a first interlayer insulating layer ILD1, a second active layer, a third gate insulating layer GI3, a third gate layer GAT3, a second interlayer insulating layer ILD2, a first source-drain layer, a first via insulating layer VIA1, and a second source-drain layer.

The substrate SUB may be a flexible substrate including an organic material. According to an embodiment, the substrate SUB may include a first organic layer OL1, a first barrier layer BAR1 disposed on the first organic layer OL1, a second organic layer OL2 disposed on the first barrier layer BAR1, and a second barrier layer BAR2 disposed on the second organic layer OL2. According to an embodiment, each of the first organic layer OL1 and the second organic layer OL2 may include an organic insulating material. For example, each of the first organic layer OL1 and the second organic layer OL2 may include polyimide (PI). According to an embodiment, each of the first barrier layer BAR1 and the second barrier layer BAR2 may include an inorganic insulating material. For example, each of the first barrier layer BAR1 and the second barrier layer BAR2 may include a silicon compound or amorphous silicon.

The buffer layer BUF may be disposed on the substrate SUB. According to an embodiment, the buffer layer BUF may include an inorganic insulating material. For example, the buffer layer BUF may include silicon oxide, silicon nitride, silicon oxynitride, and the like.

The first active layer ACT1 may be disposed on the buffer layer BUF. According to an embodiment, the first active layer ACT1 may include polycrystalline silicon. The first electrode, a channel, and the second electrode of the first transistor T1, the first electrode, a channel, and the second electrode of the second transistor T2, the first electrode, a channel, and the second electrode of the fifth transistor T5, the first electrode, a channel, and the second electrode of the sixth transistor T6, and the first electrode, a channel, and the second electrode of the seventh transistor T7 may be formed along the first active layer ACT1.

The first gate insulating layer GI1 may be disposed on the first active layer ACT1. According to an embodiment, the first gate insulating layer GI1 may include an inorganic insulating material. For example, the first gate insulating layer GI1 may include silicon oxide, silicon nitride, silicon oxynitride, and the like.

The first gate layer GAT1 may be disposed on the first gate insulating layer GI1. According to an embodiment, the first gate layer GAT1 may include a conductive material. For example, the first gate layer GAT1 may include a metal, a metal compound, and the like. The gate electrode of the first transistor T1, the gate electrode G2 of the second transistor T2, the gate electrode of the fifth transistor T5, the gate electrode of the sixth transistor T6, the gate electrode of the seventh transistor T7, and the first electrode of the storage capacitor CST may be formed by the first gate layer GAT1.

The second gate insulating layer GI2 may be disposed on the first gate layer GAT1. According to an embodiment, the second gate insulating layer GI2 may include an inorganic insulating material. For example, the second gate insulating layer GI2 may include silicon oxide, silicon nitride, silicon oxynitride, and the like.

The second gate layer GAT2 may be disposed on the second gate insulating layer GI2. According to an embodiment, the second gate layer GAT2 may include a conductive material. For example, the second gate layer GAT2 may include a metal, a metal compound, and the like. The bottom gate electrode of the third transistor T3, the bottom gate electrode of the fourth transistor T4, and the second electrode of the storage capacitor CST may be formed by the second gate layer GAT2.

The first interlayer insulating layer ILD1 may be disposed on the second gate layer GAT2. According to an embodiment, the first interlayer insulating layer ILD1 may include an inorganic insulating material. For example, the first interlayer insulating layer ILD1 may include silicon oxide, silicon nitride, silicon oxynitride, and the like.

The second active layer may be disposed on the first interlayer insulating layer ILD1. According to an embodiment, the second active layer may include an oxide semiconductor. The first electrode, a channel, and the second electrode of the third transistor T3 and the first electrode, a channel, and the second electrode of the fourth transistor T4 may be formed along the second active layer.

The third gate insulating layer GI3 may be disposed on the second active layer. According to an embodiment, the third gate insulating layer GI3 may include an inorganic insulating material. For example, the third gate insulating layer GI3 may include silicon oxide, silicon nitride, silicon oxynitride, and the like.

The third gate layer GAT3 may be disposed on the third gate insulating layer GI3. According to an embodiment, the third gate layer GAT3 may include a conductive material. For example, the third gate layer GAT3 may include a metal, a metal compound, and the like. The top gate electrode of the third transistor T3 and the top gate electrode of the fourth transistor T4 may be formed by the third gate layer GAT3.

The second interlayer insulating layer ILD2 may be disposed on the third gate layer GAT3. According to an embodiment, the second interlayer insulating layer ILD2 may include an inorganic insulating material. For example, the second interlayer insulating layer ILD2 may include silicon oxide, silicon nitride, silicon oxynitride, and the like.

The first source-drain layer may be disposed on the second interlayer insulating layer ILD2. According to an embodiment, the first source-drain layer may include a conductive material. For example, the first source-drain layer may include a metal, a metal compound, and the like. The first source-drain layer may include an initialization voltage line IVL and a connection pattern CP. The initialization voltage line IVL may make contact with a portion of the first active layer ACT1 corresponding to the first electrode of the seventh transistor T7 through a contact hole. The connection pattern CP may make contact with a portion of the first active layer ACT1 corresponding to the first electrode of the second transistor T2 through a contact hole.

The first via insulating layer VIA1 may be disposed on the first source-drain layer. According to an embodiment, the first via insulating layer VIA1 may include an inorganic insulating material. For example, the first via insulating layer VIA1 may include silicon oxide, silicon nitride, silicon oxynitride, and the like. According to another embodiment, the first via insulating layer VIA1 may include an organic insulating material. For example, the first via insulation layer VIA1 may include polyimide (PI), and the like.

The second source-drain layer may be disposed on the first via insulating layer VIA1. According to an embodiment, the second source-drain layer may include a conductive material. For example, the second source-drain layer may include a metal, a metal compound, and the like. The first source-drain layer may include a data line DL. The data line DL may make contact with the connection pattern CP through a contact hole.

The initialization voltage line IVL may be adjacent to the second transistor T2 when viewed in a plan view. According to an embodiment, the initialization voltage line IVL may at least partially overlap the gate electrode G2 of the second transistor T2 when viewed in a plan view. When the initialization voltage line IVL is adjacent to the second transistor T2 when viewed in a plan view, an initialization voltage VAINT that is less than 0 V (e.g., about −7.3 V) is applied to the initialization voltage line IVL, and a gate high voltage that is greater than 0 V (about 7.4 V) is applied to the gate electrode G2 of the second transistor T2, induced charges may be accumulated in a portion of the substrate SUB (e.g., the second organic layer OL2) located under the second transistor T2. When the induced charges are accumulated in the portion of the substrate SUB located under the second transistor T2, a threshold voltage of the second transistor T2 may be shifted, so that a leakage current of the second transistor T2 may be increased. When the leakage current of the second transistor T2 is increased, a flicker may be visually recognized in an image displayed by the display device 100.

Figure 5:
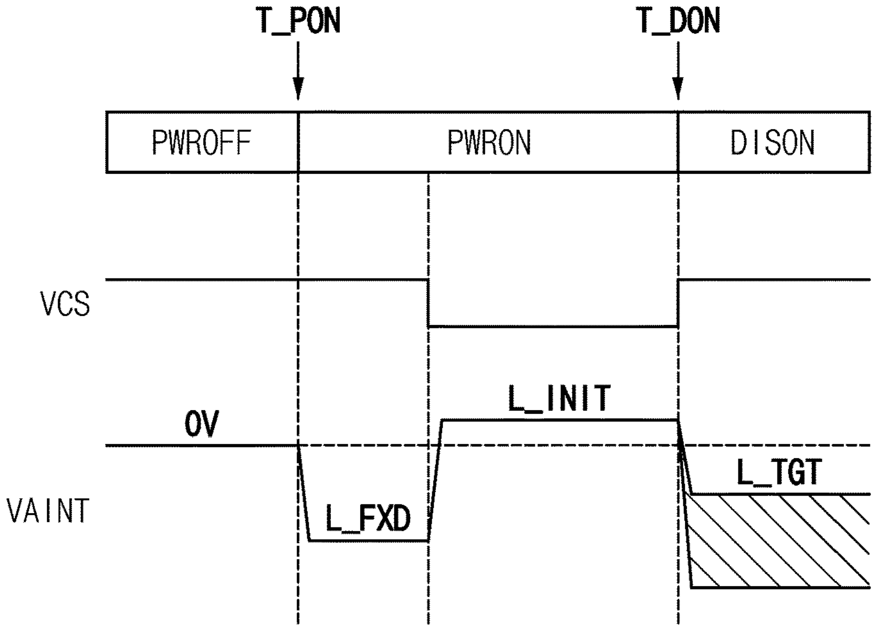
FIG. 5 is a view for describing control of an initialization voltage according to an embodiment of the present disclosure.

FIG. 5 is a view for describing control of an initialization voltage VAINT according to an embodiment of the present disclosure.

Referring to FIGS. 1 to 5, according to an embodiment, the power manager 150 may change the voltage level of the initialization voltage VAINT to a predetermined fixed level L_FXD at or after a power-on time T_PON at which a power starts to be supplied to the display device 100. A period before the power-on time T_PON may be defined as a power-off period PWROFF. In the power-off period PWROFF, the voltage level of the initialization voltage VAINT may be about 0 V. The fixed level L_FXD may be less than 0 V, and may be, for example, about −5 V.

The power manager 150 may change the voltage level of the initialization voltage VAINT to an initialization level L_INIT before a display-on time T_DON at which the display device 100 starts to display the image based on the voltage control signal VCS. The power manager 150 may change the voltage level of the initialization voltage VAINT from the fixed level L_FXD to the initialization level L_INIT in response to a falling edge of the voltage control signal VCS. A period after the power-on time T_PON and before the display-on time T_DON may be defined as a power-on period PWRON. An absolute value of the initialization level L_INIT may be less than an absolute value of the fixed level L_FXD. According to an embodiment, the initialization level L_INIT may be about −1 V to about 1 V.

The power manager 150 may change the voltage level of the initialization voltage VAINT to a target level L_TGT corresponding to a luminance of the image at or after the display-on time T_DON based on the voltage control signal VCS. The power manager 150 may change the voltage level of the initialization voltage VAINT from the initialization level L_INIT to the target level L_TGT in response to a rising edge of the voltage control signal VCS. A period after the display-on time T_DON may be defined as a display-on period DISON. The absolute value of the initialization level L_INIT may be less than an absolute value of the target level L_TGT. According to an embodiment, the target level L_TGT may be about −7 V to about −2 V. The target level L_TGT may be gradually decreased as the luminance of the image decreases, and the target level L_TGT may be gradually increased as the luminance of the image increases. For example, when the luminance of the image corresponds to a lowest gray level, the target level L_TGT may be about −7 V, and when the luminance of the image corresponds to a highest gray level, the target level L_TGT may be about −2 V.

According to an embodiment, a polarity of the initialization level L_INIT may be different from a polarity of the target level L_TGT. For example, when the target level L_TGT is less than 0 V, the initialization level L_INIT may be greater than 0 V.

Since the voltage level of the initialization voltage VAINT is changed to the initialization level L_INIT having the absolute value that is less than the absolute value of the target level L_TGT at or after the power-on time T_PON and before the display-on time T_DON in the present embodiment, an amount of the induced charges accumulated in the substrate SUB due to the adjacency of the initialization voltage line IVL and the second transistor T2 may be reduced, and the shift of the threshold voltage of the second transistor T2 may be reduced. Accordingly, the leakage current of the second transistor T2 may be reduced, and display quality of the image displayed by the display device 100 may be improved. In addition, since the voltage level of the initialization voltage VAINT is changed to the initialization level L_INIT before the display-on time T_DON, the change in the voltage level of the initialization voltage VAINT may not influence the image display of the display device 100.

Figure 6:
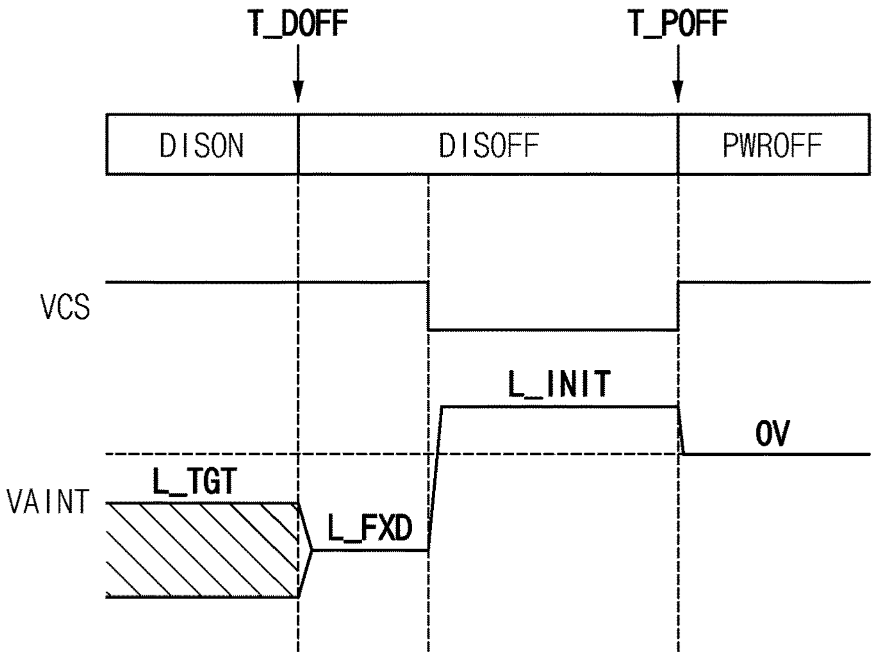
FIG. 6 is a view for describing the control of the initialization voltage according to an embodiment of the present disclosure.

FIG. 6 is a view for describing the control of the initialization voltage VAINT according to an embodiment of the present disclosure.

Referring to FIGS. 1 to 6, according to an embodiment, the power manager 150 may change the voltage level of the initialization voltage VAINT from the target level L_TGT to the fixed level L_FXD at or after a display-off time T_DOFF at which the display device 100 starts to end the display of the image. A period after the display-on time T_DON and before the display-off time T_DOFF may be defined as the display-on period DISON. In the display-on period DISON, the voltage level of the initialization voltage VAINT may be the target level L_TGT.

The power manager 150 may change the voltage level of the initialization voltage VAINT to the initialization level L_INIT before a power-off time T_POFF at which the supply of the power to the display device 100 starts to be cut off based on the voltage control signal VCS. The power manager 150 may change the voltage level of the initialization voltage VAINT from the fixed level L_FXD to the initialization level L_INIT in response to the falling edge of the voltage control signal VCS. A period after the display-off time T_DOFF and before the power-off time T_POFF may be defined as a display-off period DISOFF.

The power manager 150 may change the voltage level of the initialization voltage VAINT to about 0 V at or after the power-off time T_POFF based on the voltage control signal VCS. The power manager 150 may change the voltage level of the initialization voltage VAINT from the initialization level L_INIT to about 0 V in response to the rising edge of the voltage control signal VCS. A period after the power-off time T_POFF may be defined as the power-off period PWROFF.

Since the voltage level of the initialization voltage VAINT is changed to the initialization level L_INIT having the absolute value that is less than the absolute value of the target level L_TGT at or after the display-off time T_DOFF and before the power-off time T_POFF in the present embodiment, the amount of the induced charges accumulated in the substrate SUB due to the adjacency of the initialization voltage line IVL and the second transistor T2 may be reduced, and the shift of the threshold voltage of the second transistor T2 may be reduced. Accordingly, the leakage current of the second transistor T2 may be reduced, and the display quality of the image displayed by the display device 100 may be improved. In addition, since the voltage level of the initialization voltage VAINT is changed to the initialization level L_INIT at or after the display-off time T_DOFF, the change in the voltage level of the initialization voltage VAINT may not influence the image display of the display device 100.

Figure 7:
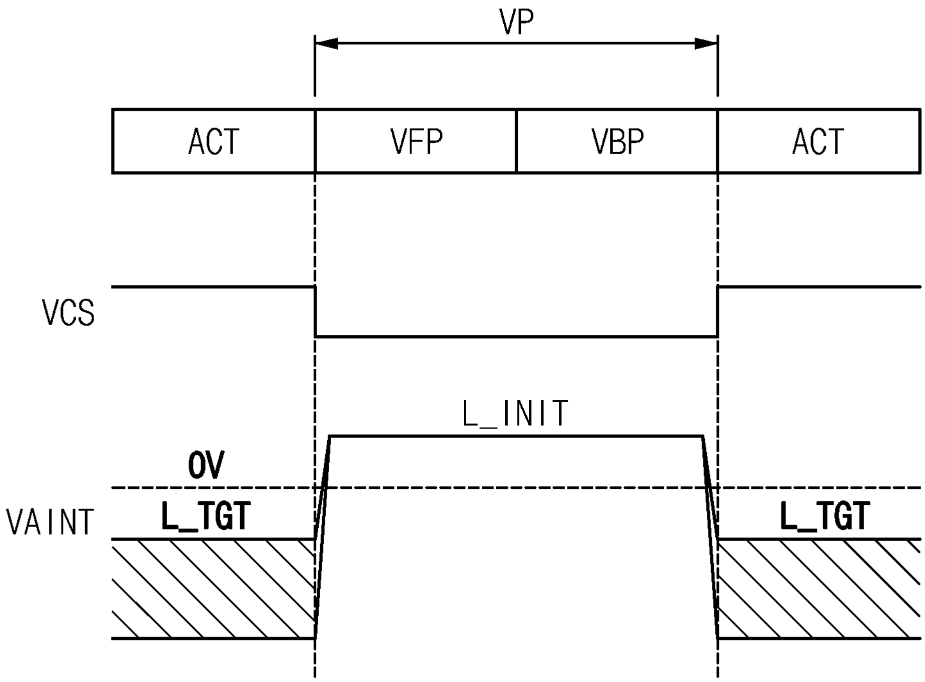
FIG. 7 is a view for describing the control of the initialization voltage according to an embodiment of the present disclosure.

FIG. 7 is a view for describing the control of the initialization voltage VAINT according to an embodiment of the present disclosure.

Referring to FIGS. 1 to 7, according to an embodiment, the power manager 150 may change the voltage level of the initialization voltage VAINT to the target level L_TGT in an active period ACT in which the data voltages VDAT are provided to the pixels PX based on the voltage control signal VCS. The power manager 150 may change the voltage level of the initialization voltage VAINT from the initialization level L_INIT to the target level L_TGT in response to the rising edge of the voltage control signal VCS.

The power manager 150 may change the voltage level of the initialization voltage VAINT to the initialization level L_INIT in a vertical porch period VP in which the data voltages VDAT are not provided to the pixels PX based on the voltage control signal VCS. The power manager 150 may change the voltage level of the initialization voltage VAINT from the target level L_TGT to the initialization level L_INIT in response to the falling edge of the voltage control signal VCS. The vertical porch period VP may include a vertical front porch period VFP after the active period ACT, and a vertical back porch period VBP before the active period ACT.

Since the voltage level of the initialization voltage VAINT is changed to the initialization level L_INIT having the absolute value that is less than the absolute value of the target level L_TGT in the vertical porch period VP in the present embodiment, the amount of the induced charges accumulated in the substrate SUB due to the adjacency of the initialization voltage line IVL and the second transistor T2 may be reduced, and the shift of the threshold voltage of the second transistor T2 may be reduced. Accordingly, the leakage current of the second transistor T2 may be reduced, and the display quality of the image displayed by the display device 100 may be improved. In addition, since the voltage level of the initialization voltage VAINT is changed to the initialization level L_INIT in the vertical porch period VP in which the data voltages VDAT are not provided to the pixels PX, an influence of the change in the voltage level of the initialization voltage VAINT on the display device 100 may be minimized.

Figure 8:
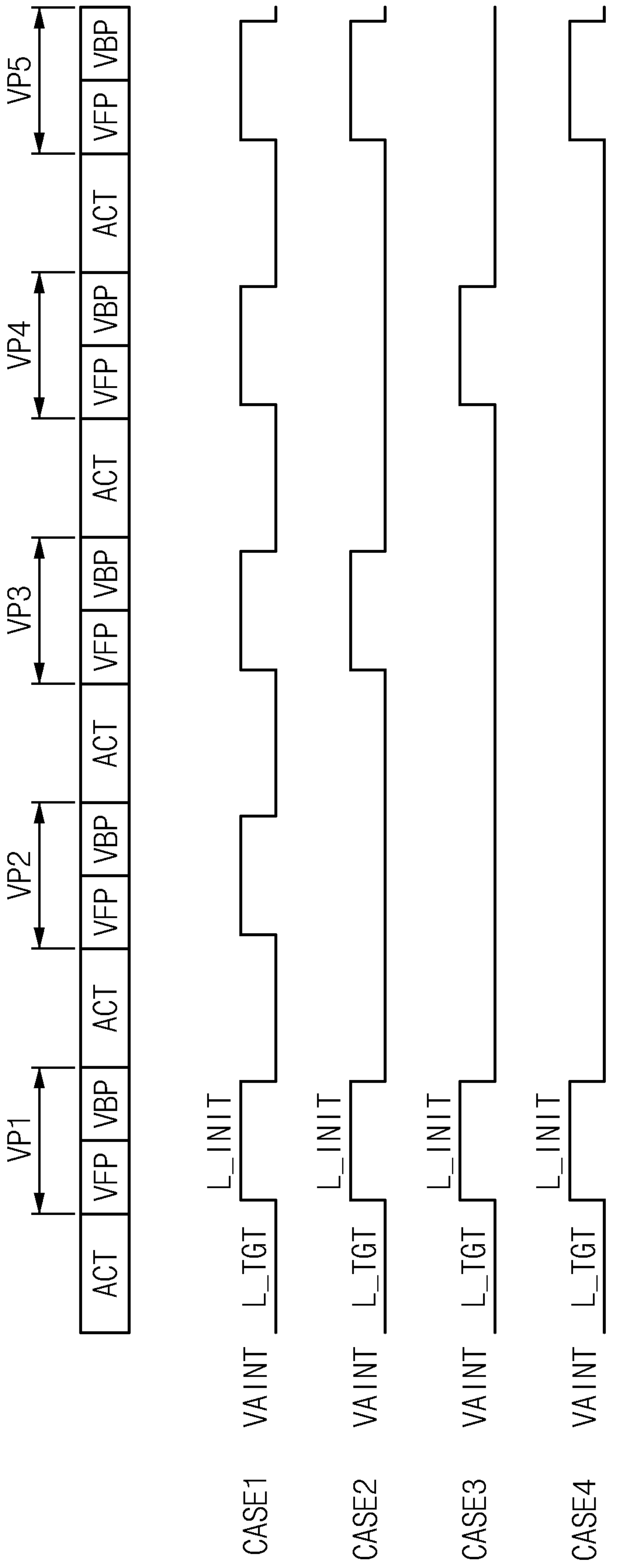
FIG. 8 is a view for describing the control of the initialization voltage according to an embodiment of the present disclosure.

FIG. 8 is a view for describing the control of the initialization voltage VAINT according to an embodiment of the present disclosure.

Referring to FIGS. 1 and 8, according to an embodiment, the power manager 150 may change the voltage level of the initialization voltage VAINT to the initialization level L_INIT in each of vertical porch periods VP. For example, the power manager 150 may change the voltage level of the initialization voltage VAINT to the initialization level L_INIT in each of consecutive first to fifth vertical porch periods VP1 to VP5 as in CASE1.

According to an embodiment, the power manager 150 may periodically change the voltage level of the initialization voltage VAINT to the initialization level L_INIT in one porch period VP among a plurality of vertical porch periods VP. For example, the power manager 150 may change the voltage level of the initialization voltage VAINT to the initialization level L_INIT in each of the first, third, and fifth vertical porch periods VP1, VP3, and VP5 as in CASE2, change the voltage level of the initialization voltage VAINT to the initialization level L_INIT in each of the first and fourth vertical porch periods VP1 and VP4 as in CASE3, or change the voltage level of the initialization voltage VAINT to the initialization level L_INIT in each of the first and fifth vertical porch periods VP1 and VP5 as in CASE4.

Figure 9:
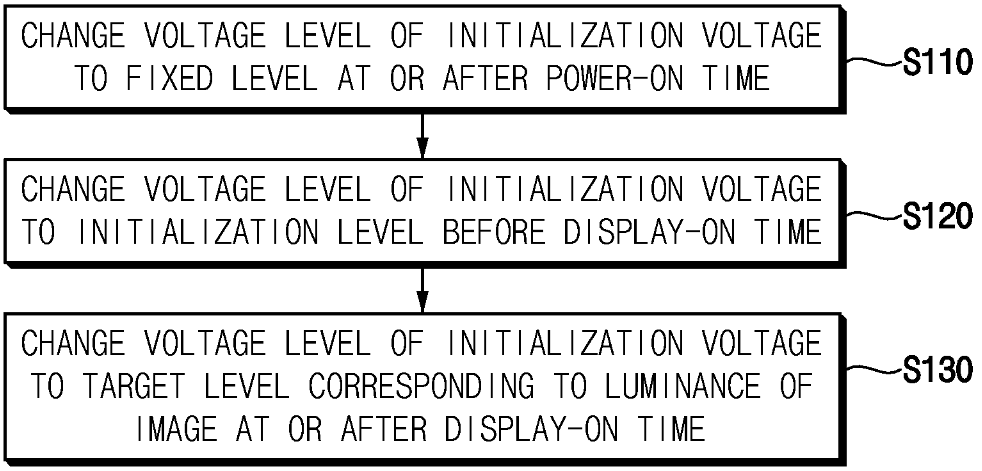
FIG. 9 is a flowchart showing a method of driving a display device according to an embodiment of the present disclosure.

FIG. 9 is a flowchart showing a method of driving a display device according to an embodiment of the present disclosure.

Referring to FIGS. 1, 5, and 9, according to an embodiment, a power manager 150 may change a voltage level of an initialization voltage VAINT to a fixed level L_FXD at or after a power-on time T_PON (S110). In a power-off period PWROFF, the voltage level of the initialization voltage VAINT may be about 0 V. The fixed level L_FXD may be less than 0 V, and may be, for example, about −5 V.

The power manager 150 may change the voltage level of the initialization voltage VAINT to an initialization level L_INIT before a display-on time T_DON based on a voltage control signal VCS (S120). The power manager 150 may change the voltage level of the initialization voltage VAINT from the fixed level L_FXD to the initialization level L_INIT in response to a falling edge of the voltage control signal VCS. An absolute value of the initialization level L_INIT may be less than an absolute value of the fixed level L_FXD. According to an embodiment, the initialization level L_INIT may be about −1 V to about 1 V.

The power manager 150 may change the voltage level of the initialization voltage VAINT to a target level L_TGT corresponding to a luminance of an image at or after the display-on time T_DON based on the voltage control signal VCS (S130). The power manager 150 may change the voltage level of the initialization voltage VAINT from the initialization level L_INIT to the target level L_TGT in response to a rising edge of the voltage control signal VCS. The absolute value of the initialization level L_INIT may be less than an absolute value of the target level L_TGT. According to an embodiment, the target level L_TGT may be about −7 V to about −2 V.

According to an embodiment, a polarity of the initialization level L_INIT may be different from a polarity of the target level L_TGT. For example, when the target level L_TGT is less than 0 V, the initialization level L_INIT may be greater than 0 V.

Figure 10:
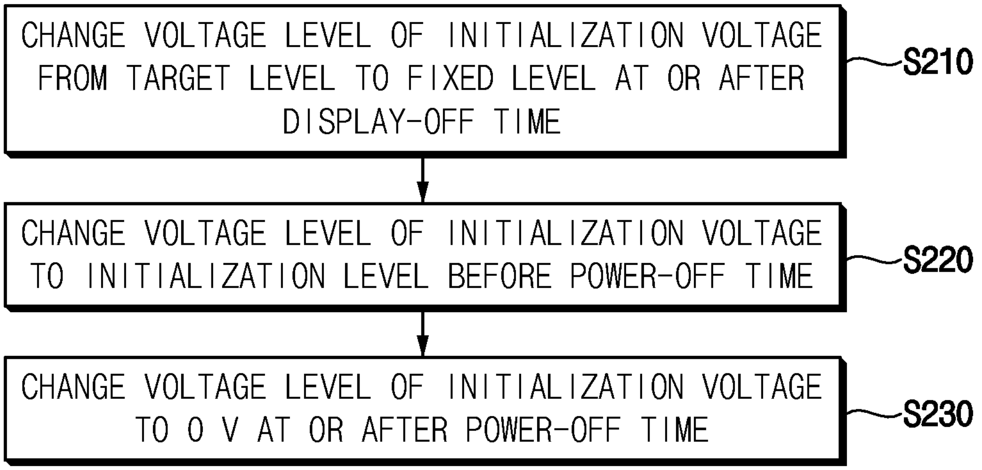
FIG. 10 is a flowchart showing a method of driving a display device according to an embodiment of the present disclosure.

FIG. 10 is a flowchart showing a method of driving a display device according to an embodiment of the present disclosure.

Referring to FIGS. 1, 6, and 10, according to an embodiment, a power manager 150 may change a voltage level of an initialization voltage VAINT from a target level L_TGT to a fixed level L_FXD at or after a display-off time T_DOFF (S210). In a display-on period DISON, the voltage level of the initialization voltage VAINT may be the target level L_TGT.

The power manager 150 may change the voltage level of the initialization voltage VAINT to an initialization level L_INIT before a power-off time T_POFF based on a voltage control signal VCS (S220). The power manager 150 may change the voltage level of the initialization voltage VAINT from the fixed level L_FXD to the initialization level L_INIT in response to a falling edge of the voltage control signal VCS.

The power manager 150 may change the voltage level of the initialization voltage VAINT to about 0 V at or after the power-off time T_POFF based on the voltage control signal VCS (S230). The power manager 150 may change the voltage level of the initialization voltage VAINT from the initialization level L_INIT to about 0 V in response to a rising edge of the voltage control signal VCS.

Figure 11:
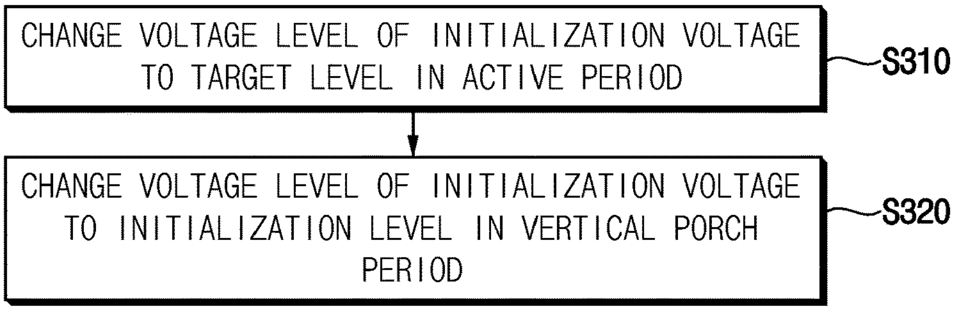
FIG. 11 is a flowchart showing a method of driving a display device according to an embodiment of the present disclosure.

FIG. 11 is a flowchart showing a method of driving a display device according to an embodiment of the present disclosure.

Referring to FIGS. 1, 7, and 11, according to an embodiment, the power manager 150 may change a voltage level of an initialization voltage VAINT to a target level L_TGT in an active period ACT based on a voltage control signal VCS (S310). The power manager 150 may change the voltage level of the initialization voltage VAINT from an initialization level L_INIT to the target level L_TGT in response to a rising edge of the voltage control signal VCS.

The power manager 150 may change the voltage level of the initialization voltage VAINT to the initialization level L_INIT in a vertical porch period VP based on the voltage control signal VCS (S320). The power manager 150 may change the voltage level of the initialization voltage VAINT from the target level L_TGT to the initialization level L_INIT in response to a falling edge of the voltage control signal VCS.

Figure 12:
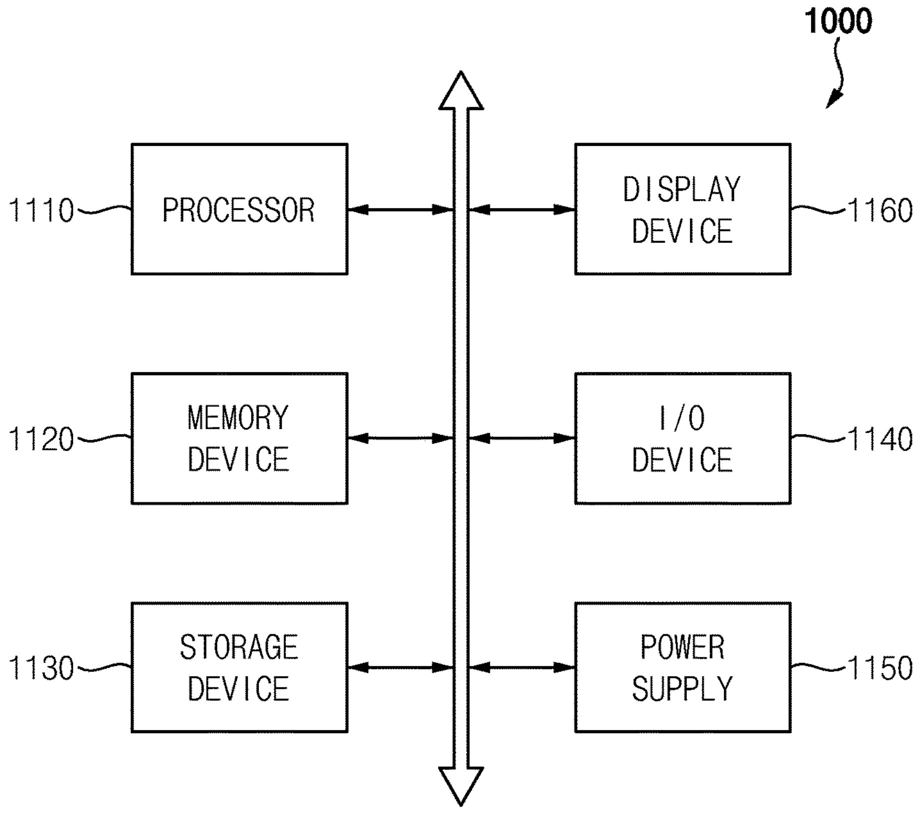
FIG. 12 is a block diagram showing an electronic device according to an embodiment of the present disclosure.

FIG. 12 is a block diagram showing an electronic device 1000 according to an embodiment of the present disclosure.

Referring to FIG. 12, an electronic device 1000 may include a processor 1110, a memory device 1120, a storage device 1130, an input/output (I/O) device 1140, a power supply 1150, and a display device 1160. The display device 1160 may correspond to the display device 100 of FIG. 1. The electronic device 1000 may further include a plurality of ports capable of communicating with a video card, a sound card, a memory card, a USB device, or the like, or communicating with other systems.

The processor 1110 may perform specific calculations or tasks. According to an embodiment, the processor 1110 may be a microprocessor, a central processing unit (CPU), or the like. The processor 1110 may be connected to other components through an address bus, a control bus, a data bus, and the like. According to an embodiment, the processor 1110 may also be connected to an expansion bus such as a peripheral component interconnect (PCI) bus. According to an embodiment, the processor 1110 may provide first image data (IMD1 of FIG. 1) and a control signal (CNT of FIG. 1) to the display device 1160.

The memory device 1120 may store data required for an operation of the electronic device 1000. For example, the memory device 1120 may include: a nonvolatile memory device such as an erasable programmable read-only memory (EPROM), an electrically erasable programmable read-only memory (EEPROM), a flash memory, a phase change random access memory (PRAM), a resistance random access memory (RRAM), a nano floating gate memory (NFGM), a polymer random access memory (PoRAM), a magnetic random access memory (MRAM), or a ferroelectric random access memory (FRAM); or a volatile memory device such as a dynamic random access memory (DRAM), a static random access memory (SRAM), or a mobile DRAM.

The storage device 1130 may include a solid state drive (SSD), a hard disk drive (HDD), a CD-ROM, and the like. The I/O device 1140 may include: an input device such as a keyboard, a keypad, a touch pad, a touch screen, or a mouse; and an output device such as a speaker or a printer. The power supply 1150 may supply a power required for the operation of the electronic device 1000. The display device 1160 may be connected to other components through the buses or other communication links.

According to the display device 1160, an absolute value of a voltage level of an initialization voltage may be reduced at or after a power-on time and before a display-on time, at or after a display-off time and before a power-off time, or in a vertical porch period within a frame period, so that an amount of induced charges in a flexible substrate may be reduced, and a shift of a threshold voltage of a transistor may be reduced. Accordingly, display quality of an image displayed by the display device 1160 may be improved.

The display device according to the embodiments may be applied to a display device included in a computer, a notebook, a mobile phone, a smart phone, a smart pad, a PMP, a PDA, an MP3 player, or the like.

Although embodiments have been described with reference to the drawings, the embodiments are examples, and may be modified and changed by a person having ordinary skill in the art without departing from the scope and spirit of the following claims.

What is claimed is:

1. A display device comprising:

a display panel including a plurality of pixels configured to receive an initialization voltage through an initialization voltage line;

a controller configured to output a voltage control signal for controlling a voltage level of the initialization voltage; and a power manager configured to provide the initialization voltage to the initialization voltage line, change the voltage level of the initialization voltage to an initialization level at or after a power-on time at which a power starts to be supplied and before a display-on time at which an image starts to be displayed based on the voltage control signal, and change the voltage level of the initialization voltage to a target level corresponding to a luminance of the image at or after the display-on time based on the power control signal, wherein the power manager is configured to change the voltage level of the initialization voltage from the target level to the initialization level during a vertical porch period in which a data voltage is not provided to each of the pixels based on the voltage control signal.

2. The display device of claim 1, wherein an absolute value of the initialization level is less than an absolute value of the target level.

3. The display device of claim 1, wherein the initialization level is about −1 V to about 1 V.

4. The display device of claim 1, wherein a polarity of the initialization level is different from a polarity of the target level.

5. The display device of claim 1, wherein the power manager is configured to change the voltage level of the initialization voltage to a predetermined fixed level at or after the power-on time and before the voltage level of the initialization voltage is changed to the initialization level, and an absolute value of the initialization level is less than an absolute value of the fixed level.

6. The display device of claim 1, wherein the power manager is configured to change the voltage level of the initialization voltage from the target level to the initialization level at or after a display-off time at which the display of the image starts to end and before a power-off time at which the supply of the power starts to be cut off based on the voltage control signal.

7. The display device of claim 6, wherein the power manager is configured to change the voltage level of the initialization voltage to a predetermined fixed level at or after the display-off time and before the voltage level of the initialization voltage is changed to the initialization level, and an absolute value of the initialization level is less than an absolute value of the fixed level.

8. The display device of claim 1, wherein each of the pixels includes:

a driving transistor configured to generate a driving current;

a write transistor connected between the driving transistor and a data line configured to transmit a data voltage;

a light emitting diode configured to emit a light based on the driving current; and a bypass transistor connected between the initialization voltage line and the light emitting diode.

9. The display device of claim 8, wherein the initialization voltage line at least partially overlaps a gate electrode of the write transistor.

10. A display device comprising:

a display panel including a plurality of pixels configured to receive an initialization voltage through an initialization voltage line;

a controller configured to output a voltage control signal for controlling a voltage level of the initialization voltage; and a power manager configured to provide the initialization voltage to the initialization voltage line, and change the voltage level of the initialization voltage from a target level corresponding to a luminance of an image to an initialization level at or after a display-off time at which display of the image starts to end and before a power-off time at which supply of a power starts to be cut off based on the voltage control signal, wherein an absolute value of the initialization level is less than an absolute value of the target level, and wherein the power manager is configured to change the voltage level of the initialization voltage to the target level during an active period in which a data voltage is provided to each of the pixels based on the voltage control signal, and change the voltage level of the initialization voltage from the target level to the initialization level during a vertical porch period in which the data voltage is not provided to each of the pixels based on the voltage control signal.

11. The display device of claim 10, wherein the initialization level is about −1 V to about 1 V.

12. The display device of claim 10, wherein a polarity of the initialization level is different from a polarity of the target level.

13. The display device of claim 10, wherein the power manager is configured to change the voltage level of the initialization voltage to a predetermined fixed level at or after the display-off time and before the voltage level of the initialization voltage is changed to the initialization level, and the absolute value of the initialization level is less than an absolute value of the fixed level.

14. The display device of claim 10, wherein each of the pixels includes:

a driving transistor configured to generate a driving current;

a write transistor connected between the driving transistor and a data line configured to transmit a data voltage;

a light emitting diode configured to emit a light based on the driving current; and a bypass transistor connected between the initialization voltage line and the light emitting diode.

15. A display device comprising:

a display panel including a plurality of pixels configured to receive an initialization voltage through an initialization voltage line;

a controller configured to output a voltage control signal for controlling a voltage level of the initialization voltage; and a power manager configured to provide the initialization voltage to the initialization voltage line, change the voltage level of the initialization voltage to a target level corresponding to a luminance of an image in an active period in which a data voltage is provided to each of the pixels based on the voltage control signal, and change the voltage level of the initialization voltage from the target level to an initialization level in a vertical porch period in which the data voltage is not provided to each of the pixels based on the voltage control signal, wherein an absolute value of the initialization level is less than an absolute value of the target level.

16. The display device of claim 15, wherein the initialization level is about −1 V to about 1 V.

17. The display device of claim 15, wherein a polarity of the initialization level is different from a polarity of the target level.

18. The display device of claim 15, wherein each of the pixels includes:

a driving transistor configured to generate a driving current;

a write transistor connected between the driving transistor and a data line configured to transmit the data voltage;

a light emitting diode configured to emit a light based on the driving current; and a bypass transistor connected between the initialization voltage line and the light emitting diode.

* * * * *